3,062,863
PROCESS FOR THE MANUFACTURE OF VINYLESTERS
Hans Fernholz, Bad Soden, Taunus, and Klaus Heimann-Trosien and Hans-Joachim Schmidt, Frankfurt am Main, Germany, assignors to Farbwerke Hoechst Aktiengesellschaft vormals Meister Lucius & Brüning, Frankfurt am Main, Germany, a corporation of Germany
No Drawing. Filed Mar. 22, 1960, Ser. No. 16,638
Claims priority, application Germany Mar. 25, 1959
8 Claims. (Cl. 260—476)

The present invention relates to a process for the manufacture of vinyl esters.

It is known to produce vinyl esters by reacting carboxylic acids with acetylene according to two different processes. In one process acetylene is allowed to act on carboxylic acids in the liquid phase in the presence of a catalyst at elevated temperature and under a pressure of up to about 25 atmospheres. The other process is carried out in the gaseous phase by conducting a mixture of carboxylic acid vapor and acetylene at elevated temperature over a catalyst. As compared with the vinylation in gaseous phase the first process possesses the advantage of being more generally applicable since it enables, for example, carboxylic acids that are difficulty vaporizable or can only be vaporized with decomposition to be reacted with acetylene, if desired in the form of their solutions. The disadvantages of said process consist in the fact that higher pressure must be applied in order to obtain satisfactory results involving higher costs as regards energy consumption and apparatus. Furthermore, when carried out continuously said process requires considerable industrial expenditure. In contradistinction thereto the vinylation of carboxylic acids in the gaseous phase can be readily carried out on a large industrial scale and in continuous manner as particularly exemplified by the manufacture of vinyl acetate. The applicability of said process in the gaseous phase is, however, restricted to a few carboxylic acids, and this for different reasons. The stability of the carboxylic acids and the vinyl ester at the elevated temperatures required for the avaporation and/or vinylation of the acid is, for example, of decisive importance. Therefore, the vinylation in the gaseous phase is especially suitable, as is known, for the manufacture of vinyl esters for some saturated fatty acids.

Processes for the manufacture of benzoic acid vinyl ester in the gaseous phase have likewise been described. But these processes have not gained any industrial importance, since the benzoic acid vinyl ester partially decomposes pyrolytically under the manufacturing conditions with the formation of acetophenone. The latter has a boiling point close to that of vinyl benzoate so that a separation becomes extremely difficult and a pure benzoic acid vinyl ester cannot be prepared in this manner. Besides, at the high temperatures required for the vinylation of benzoic acid in the gaseous phase the benzoic acid vinyl ester tends to polymerize, so that the reaction vessel (contact space) may be clogged by polymeric products and a continuation of the process may be disturbed.

The present invention is concerned with a suprprisingly simple process which overcomes the essential difficulties hitherto preventing the vinylation in the gaseous phase from being applied more generally. The process of the invention consists in evaporating the acid to be vinylated in the presence of an appropriate entrainer, preferably into a current of gaseous acetylene, and conducting at elevated temperature the vapor mixture obtained of acid and entrainer together with acetylene over one of the usual catalysts. The vinyl ester can subsequently be isolated in known manner, for example by distillation, and purified. As entrainer there can be used substances which are distillable at atmospheric pressure without decomposition, are chemically inert under the reaction conditions towards carboxylic acids, acetylene and vinyl esters, form with the acid to be vinylated azeotropically boiling mixtures and have a boiling point at atmospheric pressure that is at most 40° C. below or above the boiling point of the carboxylic acid to be vinylated. Entrainers of this kind are, for example aliphatic, cyclo-aliphatic, alkyl aromatic or aromatic hydrocarbons, the halogen compounds thereof, ethers, ketones, esters of the acid to be vinylated, such as petroleum fractions, hexane, decane, dodecane, tridecane, tetradecane, diphenyl-methane, diphenyl-propane, benzene, toluene, xylene, cumene, cymene, mesitylene, durene, diphenyl, penta-methyl-benzene, 1- or 2-ethylnaphthalene, 1,6-dimethyl-naphthalene, 1,5-dichloro- or dibromopentane, tetrabromethylene, chlorobenzene, bromobenzene, o-, m-, or p-dibromo- or dichloro-benzene, 1-chloronaphthalene, dioxane, tetrahydrofurane, diethylene glycol dimethyl ether, diethylene glycol diethyl ether or diethylene glycol dibutyl ether, triethylene glycol diethyl ether, tetraethylene glycol dimethyl ether, diphenyl ether, 1- or 2-naphthol methyl ether, diisobutyl ketone, acetophenone, 4-methoxy-acetophenone, propiophenone, butyro-phenone, or the ethyl, propyl, butyl, isobutyl or isoamyl ester of a suitable carboxylic acid, preferably of the acid to be vinylated.

When carrying out the process of the invention it is of advantage to use the carboxylic acid and the entrainer in the form of their mixtures or solutions. Liquid mixtures or solutions are, in general easier to handle, for example they can be dosed more exactly, which fact particularly applies to high melting carboxylic acids or carboxylic acids which melt with decomposition. In general it is suitable to use mixtures or solutions containing per part by weight of carboxylic acid at most 10 and preferably 5 parts by weight of entrainer. It is likewise possible, however, to employ mixtures or solutions containing more than 10 parts by weight of entrainer although this mode of operation does generally not present any special advantage. There is no lower limit of the amount of entrainer to be used. A very small amount may be used and further amounts may be added to the boiling mixture continuously or in portions, if necessary, as the entrainer is consumed. In general, however, per part by weight of carboxylic acid at least 0.1 and preferably at least 0.25 part by weight of entrainer shall be present. The composition of such mixtures substantially depends on the properties of the carboxylic acid and the vinyl ester. If, for example, an acid is concerned which is unstable in undiluted form at the temperature required for the vinylation in the gaseous phase and/or a vinyl ester that is especially liable to polymerization, it is of advantage to choose a mixing proportion such that the dilution of the carboxylic acid by the entrainer suffices for preventing in the reaction vessel a decomposition of the acid and/or a polymerization of the vinyl ester. According to the invention these undesired and disturbing side reactions can be avoided to a still better extent by evaporating the mixture of carboxylic acid and entrainer in the presence of small amounts, for example 0.01 to 4%, preferably 0.04 to 2%, calculated on the weight of the mixture of carboxylic acid and entrainer, of a suitable stabilizer. Appropriate stabilizers are, for example, polymerization inhibiting substances of phenolic nature such as hydroquinone, pyrocatechol, hydroquinone methyl ether, 2-methyl-hydroquinone, 4-methyl-2,6-ditert. butyl phenol or thymol.

In general it is of advantage to evaporate the mixture of carboxylic acid and entrainer in the presence of acetylene, preferably in an amount required for the reaction with the acid. It is advantageous but not necessary to use acetylene in excess, i.e. in a proportion of 1 mol of acid per 2-30 and preferably 8-23 mols of acetylene. The excess acetylene which has not been reacted can be recycled into the reaction vessel.

As catalysts there can be used catalysts or mixed catalysts which are generally employed for the vinylation in the gaseous phase such as zinc and/or cadmium salts which may be activated with mercury salts and which are applied to active carbon, aluminum oxide, pumice or silica gel. There are mentioned by way of example the salts of the acids to be esterified.

In general the acid is reacted with acetylene at a temperature above 150° C. and below the decomposition point of the acid under the reaction conditions applied. Said temperatures partially depend on the nature of the catalyst used. In general the process is carried out at a temperature in the range from 170-400° C. and preferably 180-320° C. Consequently, there can be used carboxylic acids that boil at atmospsheric pressure below 400° C. and preferably below 360° C. or possess a vapor pressure which is sufficient for the vinylation. The process of the invention is especially advantageous for the vinylation of carboxylic acids which are solid at normal temperature, boil at atmospheric pressure at a temperature above 200° C., distil with decomposition and/or the undiluted vinyl esters of which readily polymerize at the temperatures required for the vinylation of the carboxylic acid. Carboxylic acids of this kind are, for example, formic acid, capric acid, ethoxy-acetic acid, β-butoxy-propionic acid, bromoacetic acid, α- or β-bromo-propionic acid, mono-, di-, or trichloroacetic acid, α- or β-chloropropionic acid, acrylic acid, methacrylic acid, vinyl-acetic acid, β,β-dimethylacrylic acid, crotonic acid, β-chloroiso-crotonic acid, tiglic acid, sorbic acid, levulinic acid, α-ethylcrotonic acid, benzoic acid, o-, m-, or p-toluic, acid, 2-ethylbenzoic acid, 2-chloro- or bromo-benzoic acid, 2,5-dichloro-benzoic acid, 2,4- or 2,5-dimethyl-benzoic acid, anisic acid, cumic acid, phenyl-acetic acid, phenoxy-acetic acid, hydrocinnamic acid, hexahydrobenzoic acid, salicylic acid, cinnamic acid, pyromucic acid, or thiophene-carboxylic acid-(2). In order to purify the vinyl ester produced by the process of the invention without difficulty by distillation, to recover as distillation residue the entrainer or the mixture of entrainer and unreacted acid and to recycle said mixture into the reaction vessel, it is of advantage to use an entrainer the boiling point of which is at atmospheric pressure at least 10° C. above the boiling point of the vinyl ester.

The process of the invention and its advantages over the known processes of the vinylation in the gaseous phase is illustrated by way of example by the manufacture of benzoic acid vinyl ester. According to the indications in the literature benzoic acid has a boiling point of 249° C., a melting point of 121.7° C. and sublimes at 100° C. On account of the ability to sublime, an exact dosage of the undiluted benzoic acid and thus a uniform evaporation and controllable reaction, which is decisive for successful vinylation, are rendered extremely difficult and would require additional considerable industrial expenditure. These difficulties are overcome by the process of the invention in a simple manner. When benzoic acid is mixed with a substance that is suitable as entrainer according to the invention, for example benzoic acid butyl ester, having at atmospheric pressure a boiling point of 248° C., the use of equal parts by weight of benzoic acid and benzoic acid butyl ester gives a mixture which is present at about 90° C. in the form of a liquid solution and from which sublimes even at a temperature above 100° C. no benzoic acid or only immaterial amounts thereof, so that an exact dosage can be realized in a simple manner as in the case of a liquid carboxylic acid having a low boiling point. If this mixture is evaporated at about 200° C. in a gas current of 9-18 mols of acetylene per mol of benzoic acid and conducted at 210-230° C. over a catalyst, for example zinc acetate applied to active carbon, a yield of 64-87% of benzoic acid vinyl ester, calculated on the amount of benzoic acid used, is obtained in a single passage. A clogging of the reaction vessel by polymerized benzoic acid vinyl ester or an early decrease of the activity of the catalyst is not to be feared. The benzoic acid vinyl ester obtained after distillation is free from acetophenone and can be used, without further purification, for the manufacture of valuable polymerization products. The solution obtained as distillation residue and composed of unreacted benzoic acid and benzoic acid butyl ester can be recycled into the reaction vessel after the addition of fresh benzoic acid. The yields of benzoic acid vinyl ester are practically quantitative.

For the manufacture of benzoic acid vinyl esters by the process of the invention there may be used as entrainer instead of benzoic acid butyl ester also the aforesaid substances as far as they possess a suitable boiling point.

The following examples serve to illustrate the invention but they are not intended to limit it thereto.

*Example 1*

In a gas current of 300 liters of acetylene per hour were evaporated per hour at 200° C. 300 grams of a mixture, preheated to 100° C., of equal parts by weight of benzoic acid and benzoic acid butyl ester, and the whole was passed at 220° C. over 2 liters of a catalyst produced by applying zinc acetate to active carbon. The formed vinyl ester was condensed together with the entrainer and unreacted benzoic acid. The unreacted acetylene was recycled into the reaction vessel. The vinyl ester passing at 83-89° C. was separated from the condensate containing, in addition to benzoic acid butyl ester, 35-39% of benzoic acid vinyl ester and 15-19% of inaltered benzoic acid by distillation in vacuo under a pressure of 10 mm. of mercury, and purified. After having replaced the consumed benzoic acid, the mixture obtained as distillation residue and consisting of benzoic acid and benzoic acid butyl ester was recycled into the reaction vessel. After 5 days 19,860 grams of benzoic acid vinyl ester and 1,590 grams of unreacted benzoic acid mixed with benzoic acid butyl ester were produced from 18,108 grams of benzoic acid.

*Example 2*

As described in Example 1, 300 liters of acetylene and 200 grams of the mixture of benzoic acid and benzoic acid butyl ester were passed per hour at 230° C. over the zinc-carbon catalyst. After 37 days 106.7 kilograms of benzoic acid vinyl ester and 750 grams of unreacted benzoic acid (in benzoic acid butyl ester) were obtained from 89.3 kilograms of benzoic acid.

*Example 3*

70 grams of a solution preheated to 120° C. and consisting of 1 part by weight of benzoic acid and 2 parts by weight of a hydrocarbon mixture (petroleum fraction) having a boiling point in the range from 230-250° C. were evaporated per hour at 260° C. in an acetylene current of 45 liters per hour and the whole was passed at 280° C. over 0.2 liter of a catalyst of pumice granules impregnated with cadmium acetate. After 10 hours, 207 grams of benzoic acid vinyl ester were obtained in addition to unreacted benzoic acid.

*Example 4*

As described in Example 3, there were passed per hour at 280° C. over the cadmium-pumice catalyst 68 grams of a solution evaporated at 265-270° C. of 1 part by weight of p-toluic acid and 2 parts by weight of diphenyl ether and 46 liters of acetylene. After 28 hours 595 grams of p-toluic acid vinyl ester were obtained.

Example 5

As indicated in Example 3, there were passed per hour 46 liters of acetylene and 50 grams of a mixture of 1 part by weight of o-chlorozenzoic acid and 2 parts by weight of diphenyl methane at 280° C. over 0.2 liter of the cadmium-pumice catalyst. After 5 hours, 82 grams of o-chlorobenzoic acid vinyl ester were obtained.

Example 6

77 grams of a solution, preheated to 160° C. of 1 part by weight of cinnamic acid and 2 parts by weight of a petroleum fraction having a boiling point in the range from 260–270° C. were evaporated per hour at 265° C. in an acetylene current of 60 liters per hour and the whole was passed at 280° C. over the catalyst described in Example 3. After 6 hours 128 grams of cinnamic acid vinyl ester were obtained.

Example 7

In an acetylene current of 300 liters per hour 9.7 kilograms of a solution consisting of 1 part by weight of sorbic acid, 2 parts by weight of diethylene glycol dibutyl ether and 0.03 part by weight of hydroquinone were evaporated within 32 hours at 220° C., the whole was passed at 230° C. over 2 liters of the zinc-carbon catalyst mentioned in Example 1 and condensed. The condensate contained, in addition to unreacted starting materials, 2.58 kilograms of sorbic acid vinyl ester (boiling point 64° C. under a pressure of 6 mm. of mercury).

Example 8

50 grams of a mixture of equal parts by weight of crotonic acid and acetophenone were evaporated per hours at 190° C. in a current of 70 liters of acetylene per hour and the whole was passed at 200–210° C. over 0.2 liter of the catalyst mentioned in Example 1. After 6 hours 156 grams of crotonic acid vinyl ester were obtained. When the acetophenone was replaced by o-dichlorobenzene as entrainer similar yields were obtained.

Example 9

In an acetylene current of 70 liters per hour 30 grams of a solution of equal parts by weight of formic acid and diethyl ketone were evaporated per hour at 140° C. and the whole was passed at 180° C. over 0.2 liter of the zinc-carbon catalyst mentioned in Example 1, and condensed. After 8 hours the condensate contained, in addition to the unreacted starting materials, 139 grams of formic acid vinyl ester.

Example 10

8.5 kilograms of a 50% solution of β-butoxypropionic acid in a hydrocarbon mixture (petroleum fraction) having a boiling point of 220–230° C. were evaporated within 28 hours at 200° C. in an acetylene current of 300 liters per hour and the whole was passed at 230° C. over 2 liters of the catalyst mentioned in Example 1. 4.1 kilograms of β-butoxypropionic acid vinylester (boiling point 67° C. under a pressure of 5 mm. mercury) and 0.7 kilogram of unreacted β-butoxypropionic acid dissolved in the hydrocarbon were obtained.

Example 11

38 grams of a 50% solution of chloroacetic acid in ethylene glycol dibutyl ether were evaporated per hour at 180–190° C. in an acetylene current of 50 liters per hour and the whole was passed at 210° C. over 0.2 liter of the catalyst mentioned in Example 1. After 7 hours, 146 grams of chloroacetic acid vinyl ester were obtained.

We claim:

1. In the process for manufacturing a vinyl ester of a carboxylic acid by passing a gaseous mixture of said acid and acetylene over a catalyst, the step comprising forming a solution of a solid carboxylic acid to be vinylated, said acid having a normal boiling point between 200° C. and 400° C., with an entraining substance forming an azeotropic mixture with said acid, said entrainer being selected from the group consisting of hydrocarbons, halogenated hydrocarbons, ethers, ketones, and esters of said carboxylic acid to be vinylated, said entrainer having a boiling point between 40° C. below and 40° C. above that of said carboxylic acid, and then evaporating said azeotropic mixture of acid and entrainer, admixing the vapors of said mixture with acetylene, and passing the resultant gas mixture over said catalyst.

2. The process of claim 1 wherein the weight ratio of carboxylic acid to entrainer in said azeotropic mixture is between 1:0.1 and 1:10.

3. The process of claim 1 wherein the vapors of carboxylic acid and entrainer additionally contain from 0.01 to 4 percent by weight of a phenolic polymerization inhibitor.

4. In the process for manufacturing a vinyl ester of a carboxylic acid by passing a gaseous mixture of said acid and acetylene over a catalyst, the step comprising forming a solution of a solid carboxylic acid to be vinylated, said acid having a normal boiling point between 200° C. and 400° C., with from 0.1 to 10 parts by weight of an entraining substance forming an azeotropic mixture with said acid, said entrainer being selected from the group consisting of hydrocarbons, halogenated hydrocarbons, ethers, ketones, and esters of said carboxylic acid to be vinylated, said entrainer having a boiling point between 40° C. below and 40° C. above that of said carboxylic acid, and then evaporating said azeotropic mixture of acid and entrainer, admixing the vapors of said mixture with from 2 to 30 moles of acetylene per mole of acid in said vapors, and passing the resultant gas mixture over said catalyst at a temperature of from 150° C. to 400° C.

5. A process for making vinyl benzoate which comprises forming an azeotropic mixture of 1 part by weight of benzoic acid with up to 10 parts by weight of butyl benzoate, evaporating said azeotropic mixture, admixing the vapors of said mixture with from 9 to 18 moles of acetylene per mole of benzoic acid in said vapors, passing the resulting gas mixture over an activated carbon-zinc catalyst at a temperature of from 210° C. to 230° C., cooling the reacted gas mixture to condense liquid components thereof, and recovering vinyl benzoate from the condensate.

6. The process of claim 1, wherein the carboxylic acid is benzoic acid.

7. The process of claim 1, wherein the carboxylic acid in p-toluic acid.

8. The process of claim 1, wherein the carboxylic acid is sorbic acid.

References Cited in the file of this patent

UNITED STATES PATENTS

| | | |
|---|---|---|
| 2,066,075 | Reppe | Dec. 29, 1936 |
| 2,342,463 | Fischer et al. | Feb. 22, 1944 |
| 2,472,086 | Beller et al. | June 7, 1949 |